United States Patent [19]

Tsukahara et al.

[11] Patent Number: 5,521,664
[45] Date of Patent: May 28, 1996

[54] CAMERA WITH FLASH-PREVENTION MODE OVERRIDE

[75] Inventors: Daiki Tsukahara, Hiratsuka; Hidenobu Kaji, Kawasaki; Isao Soshi, Tokyo, all of Japan

[73] Assignee: Nikon Corporation, Tokyo, Japan

[21] Appl. No.: 335,962

[22] Filed: Nov. 7, 1994

[30] Foreign Application Priority Data

Nov. 5, 1993 [JP] Japan .................................. 5-299165
Oct. 28, 1994 [JP] Japan .................................. 6-265212

[51] Int. Cl.⁶ .................................................. G03B 15/03
[52] U.S. Cl. .................... 354/137; 354/127.1; 354/145.1; 354/413; 354/419
[58] Field of Search ...................................... 354/137, 138, 354/145.1, 127.1, 413, 419

[56] References Cited

U.S. PATENT DOCUMENTS 4,933,702  6/1990  Komatsuzuki et al. .
4,951,068  8/1990  Ichikawa et al. .
4,951,081  8/1990  Hosomizu et al. .
5,134,433  7/1992  Takami et al. .
5,159,381  10/1992 Harrison .
5,250,977  10/1993 Tanaka .
5,313,247  5/1994  Hosomizu et al. .
5,361,120  11/1994 Takami .

FOREIGN PATENT DOCUMENTS

4-86734  3/1992  Japan .

*Primary Examiner*—Monroe H. Hayes
*Attorney, Agent, or Firm*—Oliff & Berridge

[57] ABSTRACT

A camera having an automatic flash prevention mode includes an override mechanism allowing a photographer to override the automatic flash prevention mode. The number of flashes and timing of the flashes can be set arbitrarily by the photographer while the shutter remains open, without requiring any cumbersome or difficult operations on the part of the photographer. The camera is especially suited for night photography or underwater photography, in which the shutter release button is pressed once to open the shutter and once again to close the shutter.

24 Claims, 6 Drawing Sheets

CAMERA WITH FLASH-PREVENTION MODE OVERRIDE

BACKGROUND OF THE INVENTION

1. Field of the Invention

The invention relates to cameras that use electronic flash devices, and more particularly, to flash-photography cameras capable of extended-time-interval photography, in which the photographer arbitrarily can select exposure time.

2. Description of Related Art

A known camera contains an internally housed strobe and can detect automatically when a subject is inadequately exposed. This camera sets a strobe automatic flash mode that causes the strobe to flash automatically, as needed. With this type of camera, a selection operation device, such as a selection button, allows switching between the automatic flash mode and an automatic flash prevention mode, which prevents automatic flash of the strobe. When the automatic flash prevention mode is selected, a forced flash mode also can be selected to flash the strobe forcibly, according to the desires of the photographer.

With this camera, however, the photographer arbitrarily uses the selection operation device to set the automatic flash mode, the automatic flash prevention mode or the forced flash mode. Depending on the photograph exposure mode of the camera, this operation can be troublesome or difficult, possibly allowing photograph opportunities to be missed.

For instance, when a night scene is being photographed, the bulb mode (B mode) typically is selected as the photograph exposure mode. In the B mode, film exposure continues for as long as the shutter release button is depressed, and the exposure is completed by removing the photographer's hand from the button. When a photograph is taken in the B mode, the automatic flash prevention mode generally is used.

Even when the B mode is selected, there are times, depending on the condition of the subject and the desires of the photographer, when the strobe should be either flashed for better photographic results—either only once during exposure, such as at the instant that the shutter release is operated, or repeatedly at specified time intervals during the exposure. In such cases, however, forced flash of the strobe cannot be achieved simply and arbitrarily, because the selection operation device must be operated to select the forced flash mode. This process is troublesome and difficult, making quick reaction to photograph opportunities impossible. Additionally, because a proper number of strobe flashes, either once at the time of shutter release or numerous times at set intervals, also must be determined, it is difficult to flash the strobe according to the desires of the photographer during extended exposure in the B mode.

With more recent cameras, a so-called time mode (T mode) has been proposed, in which exposure begins by operating the shutter release button, and ends, after a desired time interval, by again-operating the shutter release button or some other button. The T mode is effective when photographing night scenes, for example, or when taking underwater photographs of fish or similar objects. But when the T mode is used, it is difficult to flash the strobe selectively as needed, as with the B mode described above. A way to achieve strobe flash control with the T mode has not been devised.

SUMMARY OF THE INVENTION

In light of the above considerations, it is an object of the invention to provide a flash-photography camera that achieves strobe forced flash, in accordance with photograph opportunities, without requiring any special operations. When taking pictures using photographic modes suitable for night scenes, or when the timing of strobe flashes and the number of flashes is set according to the desires of the photographer, the number of blurred or otherwise unsuitable pictures can be reduced.

To achieve the above and other objects, a flash-photography camera according to embodiments of the invention is equipped with a switching device for switching exposure action to a specific mode in accordance with an operational component. A forced flash operation device forces flashing of the strobe through manual operation at the time of shutter release, at which time the camera releases the strobe automatic flash mode in accordance with the switching device. A control device sets the strobe forced flash mode when the forced flash operation device is switched on and also prevents automatic flash of the strobe.

With embodiments of the present invention, even when a photographic mode suitable for photographing a night scene is selected, flash photography may be desirable. By manually operating the forced flash operation device simultaneously with the shutter release operation, it is possible to force a flash of the strobe in accordance with the desires of the photographer. Desired flash-picture photography thus is accomplished and the number of blurred pictures is reduced. Additionally, during extended exposure in a photography mode suitable for photographing night scenes, it is possible to flash the strobe either once or numerous times, and to achieve better results when photographing moving subjects, because of the arbitrary control of flash timing.

BRIEF DESCRIPTION OF THE DRAWINGS

The invention will be described with reference to the following drawings, in which like reference numerals designate like elements and wherein.

DETAILED DESCRIPTION OF PREFERRED EMBODIMENTS

FIGS. 1–4 show a flash-photography camera according to an embodiment of the invention. The following explanation relates to a particular compact camera embodiment containing a strobe, but of course other types of cameras and other types of illumination devices can be used according to the invention.

Figure 3:
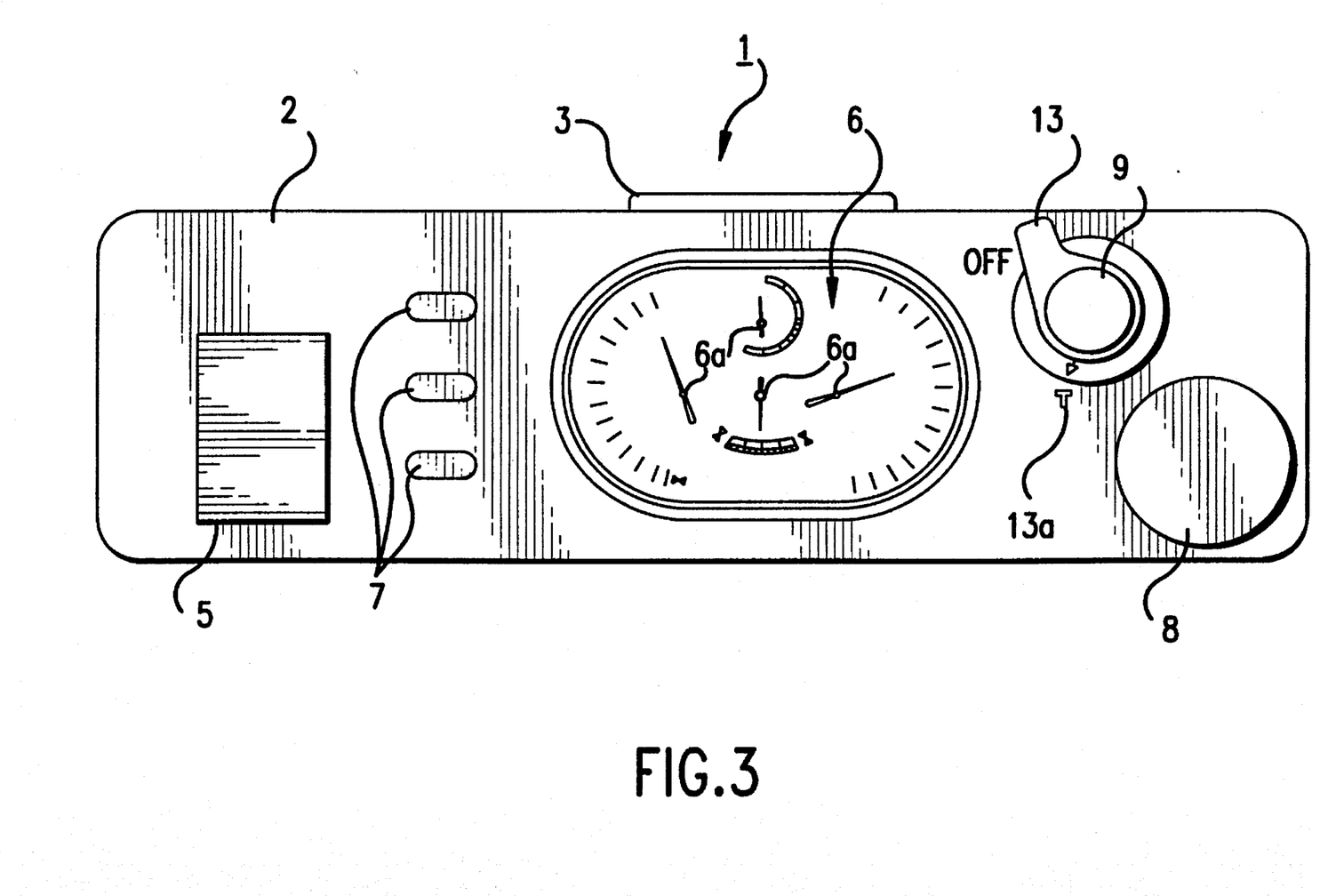
FIG. 3 is a plan view showing components on the top surface of a flash-photography camera according to an embodiment of the invention.
Figure 4:
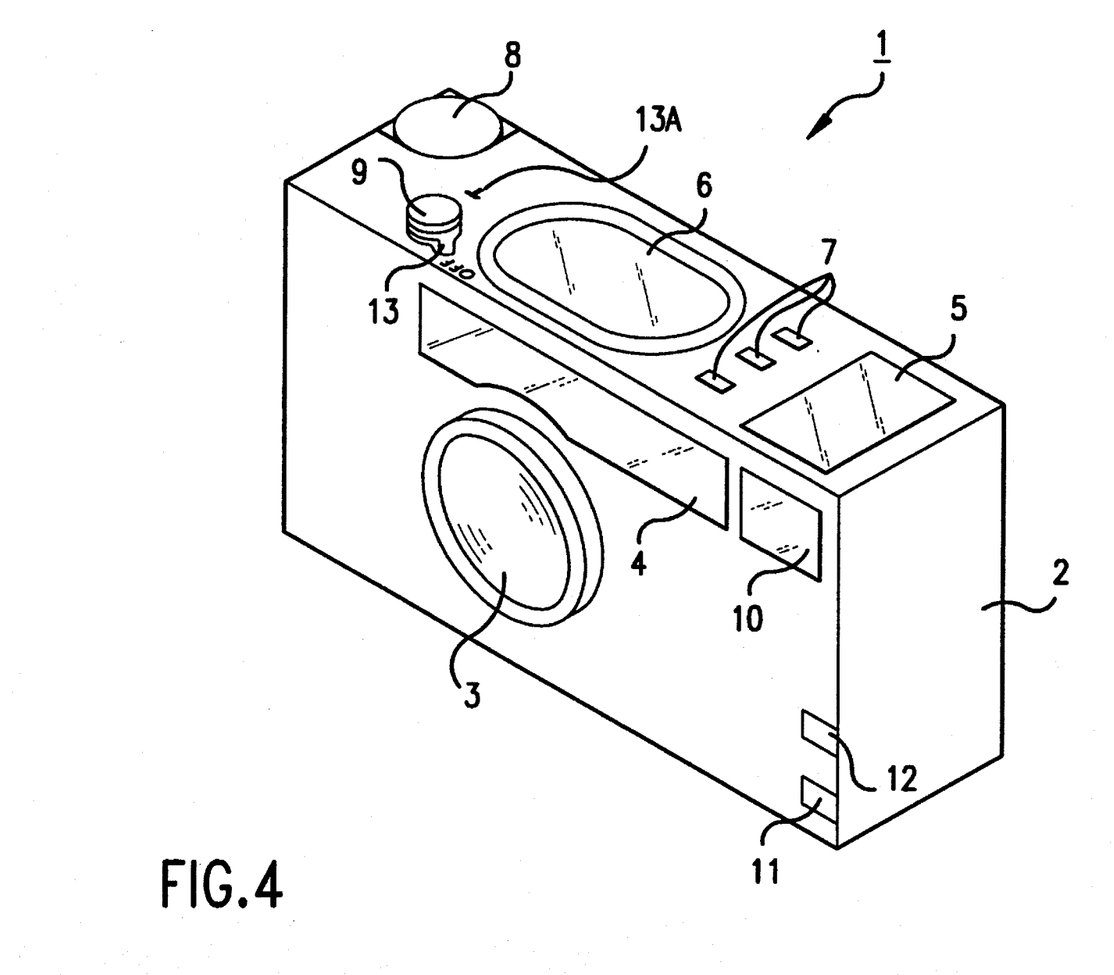
FIG. 4 is a perspective view of the FIG. 3 camera.

First, the basic structure of the camera will be described, with reference to FIGS. 3 and 4. Camera 1 is equipped with photographic lens 3, mounted in a lens barrel located in the center of the front surface of camera body 2. Above photographic lens 3, on the front surface of camera body 2, are windows 4 arranged in a row, including an AF distance measurement window, an AE photometry window, and a view finder window for a lighting-type view finder. Distance to the subject and brightness of the subject are detected through the AF measurement window and the AE photometry window, so that photography can be performed under optimal conditions.

Illuminating window 5 for the viewfinder optical system is provided at one side on the top surface of camera body 2. Display 6 is provided in the center of the top surface of camera body 2 and indicates, for example, focussing distance measurement, diaphragm indications, exposure compensation indications, film count and self timer operation. The FIG. 3 embodiment includes an analog display using needle-indicators 6a. However, the invention is not limited to this embodiment. Display 6 also can be another type of display, such as a liquid crystal display or similar digital display.

Mode buttons 7 are used to set various modes, such as a range-setting mode, for instance. Buttons 7 are arranged in a row on one side of display 6 on the top surface of camera body 2. Large command dial 8 easily controls the various other functions of the camera. Shutter release button 9 is part of an exposure mechanism for exposing a photographic medium, such as film, in the camera.

Strobe 10 is an illumination device used for flash photography and is provided adjacent to window 4 on the front surface of camera body 2. Strobe 10 is illuminated as needed when flash photography is required.

Automatic flash prevention operation button 11 is provided toward the bottom edge of one side of the front surface of camera body 2 and is part of a mode-setting mechanism to set the camera in an automatic illumination prevention mode. Forced flash operation button 12 is aligned with button 11 and is part of an override illumination mechanism for overriding the automatic flash prevention mode and setting an override illumination mode, as will be described.

Mode setting dial 13 is provided on the top surface of camera body 2, concentric with release button 9, and is a further part of the mode-setting mechanism. By rotating dial 13 to T indicator 13a, the photographer can set the photography mode of camera I to the T mode.

The T mode preferably is a mode in which exposure time during photography can be selected arbitrarily. The exposure is started by depressing shutter release button 9. The exposure is ended by operating shutter button 9 again or by some other operation, such as by setting dial 8. In particular, the T mode is favorable for night photography and underwater photography of fish, for example.

Mode setting dial 13 preferably also is provided with other indicators, such as an A to indicate a diaphragm priority mode and a P to indicate a program mode. Modes can be set arbitrarily by rotating dial 13.

With embodiments of the invention, a camera capable of flash photography allows selection of an automatic flash mode for strobe 10. Switching or mode-setting means, such as dial 13, is provided for switching the camera to another type of mode, such as the T mode, with which the automatic flash prevention mode is set, in accordance with the operation of an operating button. The camera also includes a forced flash operation device, including forced flash operation button 12, which allows forcible flashing of strobe 10, that is, override of the automatic flash prevention mode, in connection with manual operation of release button 9, or independently of release button 9. The camera also includes controller 20 (FIG. 1), which prevents automatic flash when the T mode is selected using dial 13 and when forced flash operation button 12 is turned off. When forced flash operation button 12 is turned on, the camera is set to a forced flash mode for strobe 10. This structure allows forced flash of the strobe during the T mode, according to the desires of the photographer, reducing the number of blurred pictures.

In other words, even when the T mode is selected, there are times and circumstances when flash photography using strobe 10 is desirable. In such cases, by manually operating forced flash operation button 12 while simultaneously or previously depressing release button 9, strobe 10 forcibly can be flashed immediately. Alternatively, forced flash operation button 12 can be pressed at an arbitrary time after release button 9 is depressed, for arbitrary flash timing, according to the desires of the photographer. The number of blurred pictures thus is reduced. Instead of setting the automatic flash mode, the strobe automatic flash prevention mode or the strobe forced flash mode beforehand as necessary, a camera according to an embodiment of the invention prevents strobe automatic flash in the T mode and achieves forced flash when the photographer operates the shutter release while depressing forced flash operation button 12, for example. Embodiments of the invention thus facilitate ease of use during picture-taking.

Figure 1:
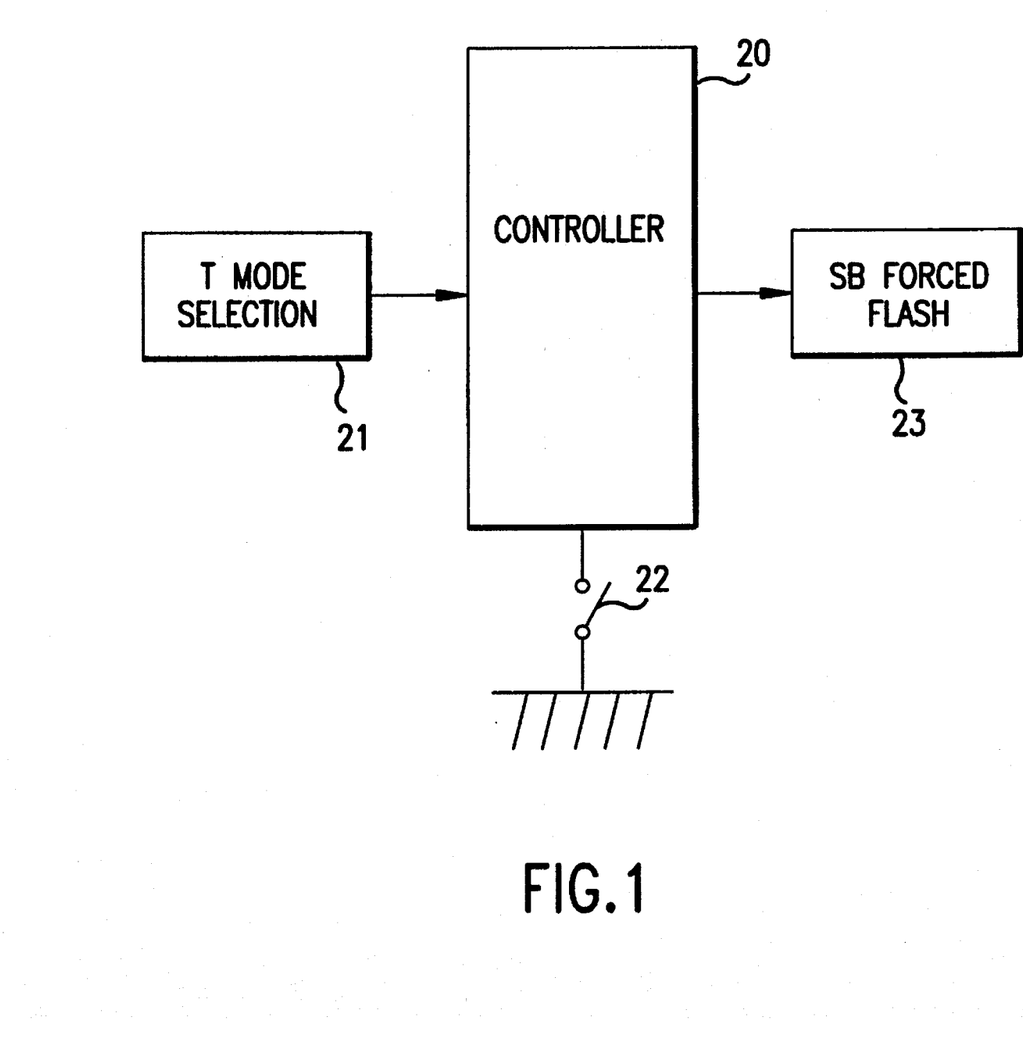
FIG. 1 is a block diagram showing the strobe control system in a flash-photography camera according to an embodiment of the invention.

In FIG. 1, box 21 represents T mode selection using mode setting dial 13. Forced flash switch 22 allows forcible illumination of the strobe, that is, override of the automatic flash prevention mode, and is activated by turning forced flash operation button 12 on and off. Box 23 represents the strobe forced flash that occurs when forced flash switch 22 is turned on. The camera forcibly illuminates strobe 10, even when the T mode is set.

Figure 2:
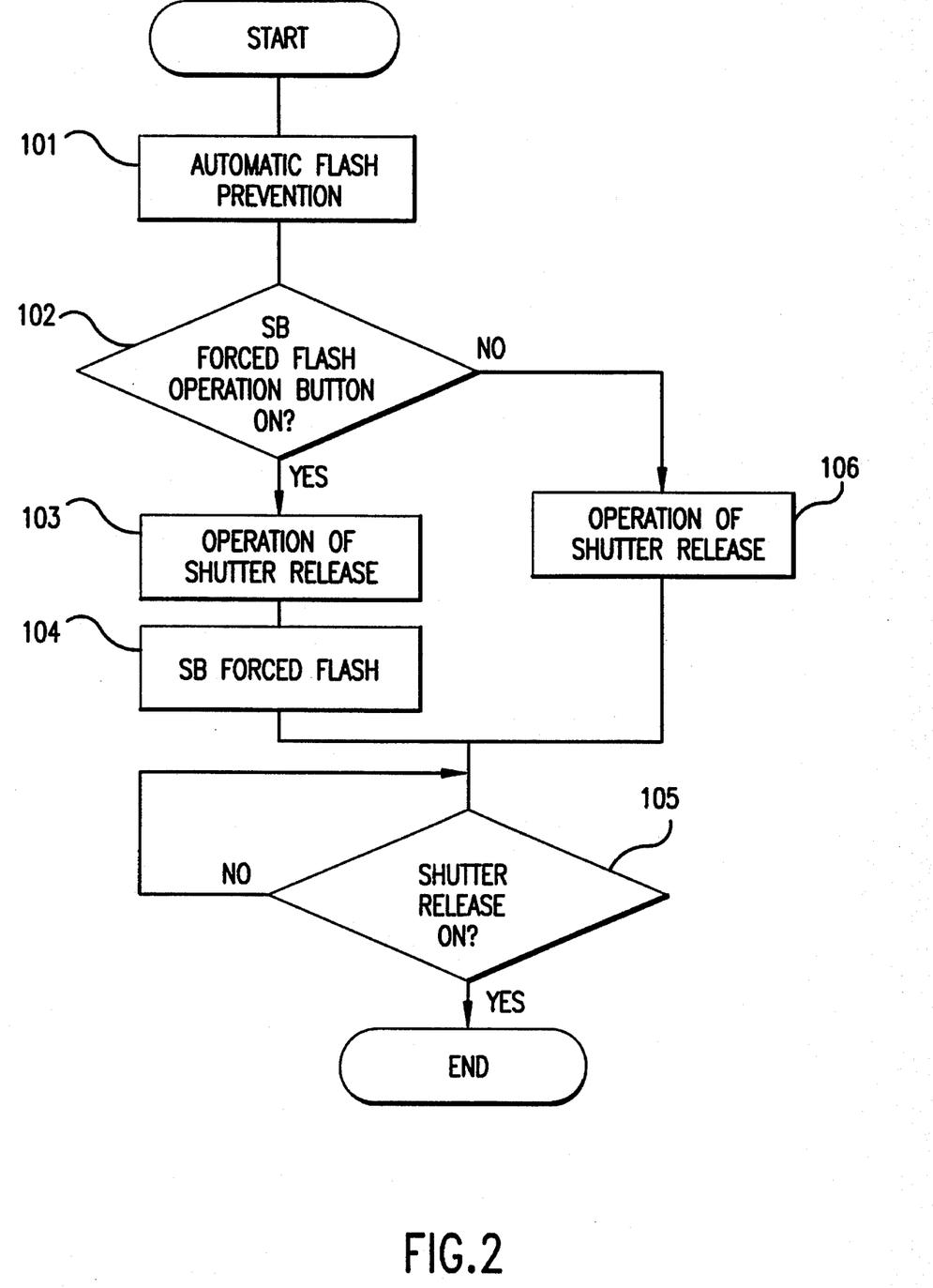
FIG. 2 is a flow chart showing operation of a camera according to an embodiment of the invention.

FIG. 2 is a flow chart of operations that occur when the T mode is selected by setting dial 13, according to embodiments of the invention.

First, as shown in step 101, when the T mode is selected, automatic flash of strobe 10 is prevented. Next, in step 102, it is determined whether strobe 10 forcibly can be illuminated during exposure in the T mode, that is, whether automatic flash prevention mode override can occur, by determining whether strobe (SB) forced flash operation button 12 is on. When the determination in step 102 is YES, the camera advances to step 103. Activating shutter release button 9 in step 103 causes strobe 10 to be illuminated forcibly in step 104. Step 105 determines when release button 9 has been operated again; step 105 is repeated until button 9 is operated again. When button 9 is turned on again, the T mode steps are completed and the process ends.

If forced flash button 12 is off in step 102, shutter release occurs in step 106 without flashing the strobe. The T mode steps then are completed after step 105.

In addition, with flash-photography cameras according to embodiments of the invention, it also is possible to illuminate strobe 10 forcibly either one time or many times by turning forced flash operation button 12 on and thereby turning forced flash switch 22 on during film exposure in the T mode. It is possible to control flash timing and the number of flashes manually or automatically in accordance with controller 20, and consequently it is possible to achieve enhanced results when photographing moving subjects, for instance. Such an embodiment of the invention now will be described with reference to the flow chart of FIG. 5.

Figure 5:
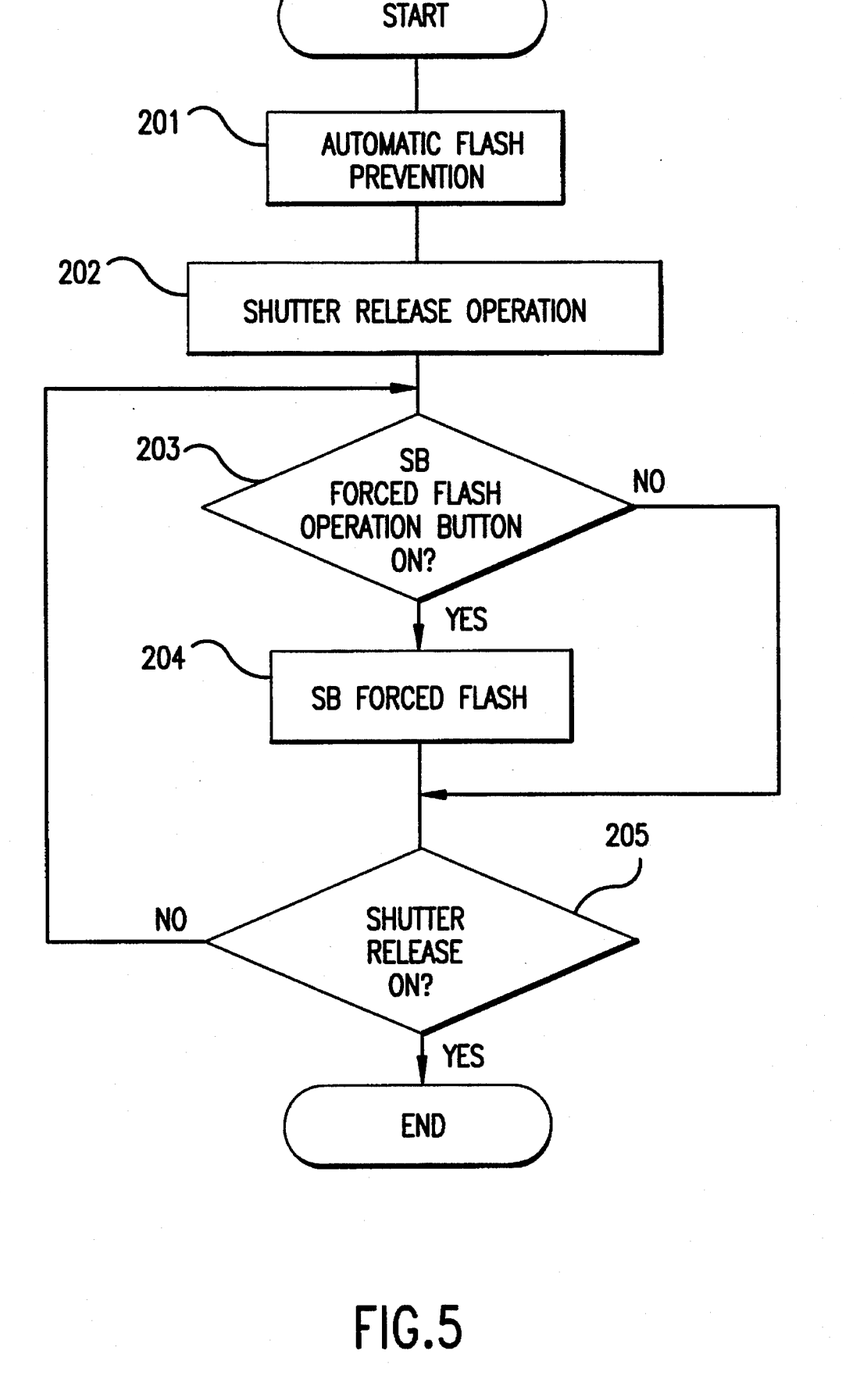
FIG. 5 is a flow chart showing operation of a camera according to an alternative embodiment of the invention.

The operations of the FIG. 5 flow chart begin when the T mode is selected in camera 1 by dial 13. First, as shown in step 201, when the T mode is selected, automatic flash of strobe 10 is prevented. Then, as shown in step 202, exposure in the T mode begins when shutter release button 9 is turned on. In step 203, it is determined whether strobe 10 can be flashed forcibly during exposure, that is, whether automatic flash prevention mode override can occur, by determining whether strobe (SB) forced flash operation button 12 is on. When the determination in step 203 is YES, the camera advances to step 204 to execute forced flash of the strobe, with appropriate flash timing. The camera then advances to step 205, where it is determined, whether release button 9 is operated again. Steps 203–205 are repeated, providing multiple flashes as long as the forced flash button is on, until release button 9 is operated again. After forced flash of the strobe has occurred as many times as desired, the process ends and the T mode steps are completed when release button 9 is operated again.

On the other hand, when it is determined in step 203 that forced flash button 12 is OFF, step 204 is skipped and the camera directly moves to step 205. The process ends after steps 203 and 205 have been executed repeatedly. The T mode then is completed with the strobe not having flashed. By repeating steps 203–205 until release button 9 again is operated, it is possible to achieve desirable flash timing at the time when forced flash operation button 12 is turned on in step 203.

Additionally, embodiments of the invention are applicable to cameras that do not use an automatic flash mode, in which a strobe automatically is activated in low-light conditions. Cameras not using an automatic flash mode but instead using a long-term exposure mode, for example, typically use both a flash mode and a flash prevention mode. In the flash mode, even if lighting conditions exceed a specified level, the strobe will flash. In the flash prevention mode, even if lighting conditions fall below a specified level, the strobe will not flash. Typically when such cameras are placed in the long-term exposure mode, the camera is automatically placed in the flash prevention mode. An embodiment of the invention applied to a camera that does not use an automatic flash mode now will be described with reference to FIG. 6.

Figure 6:
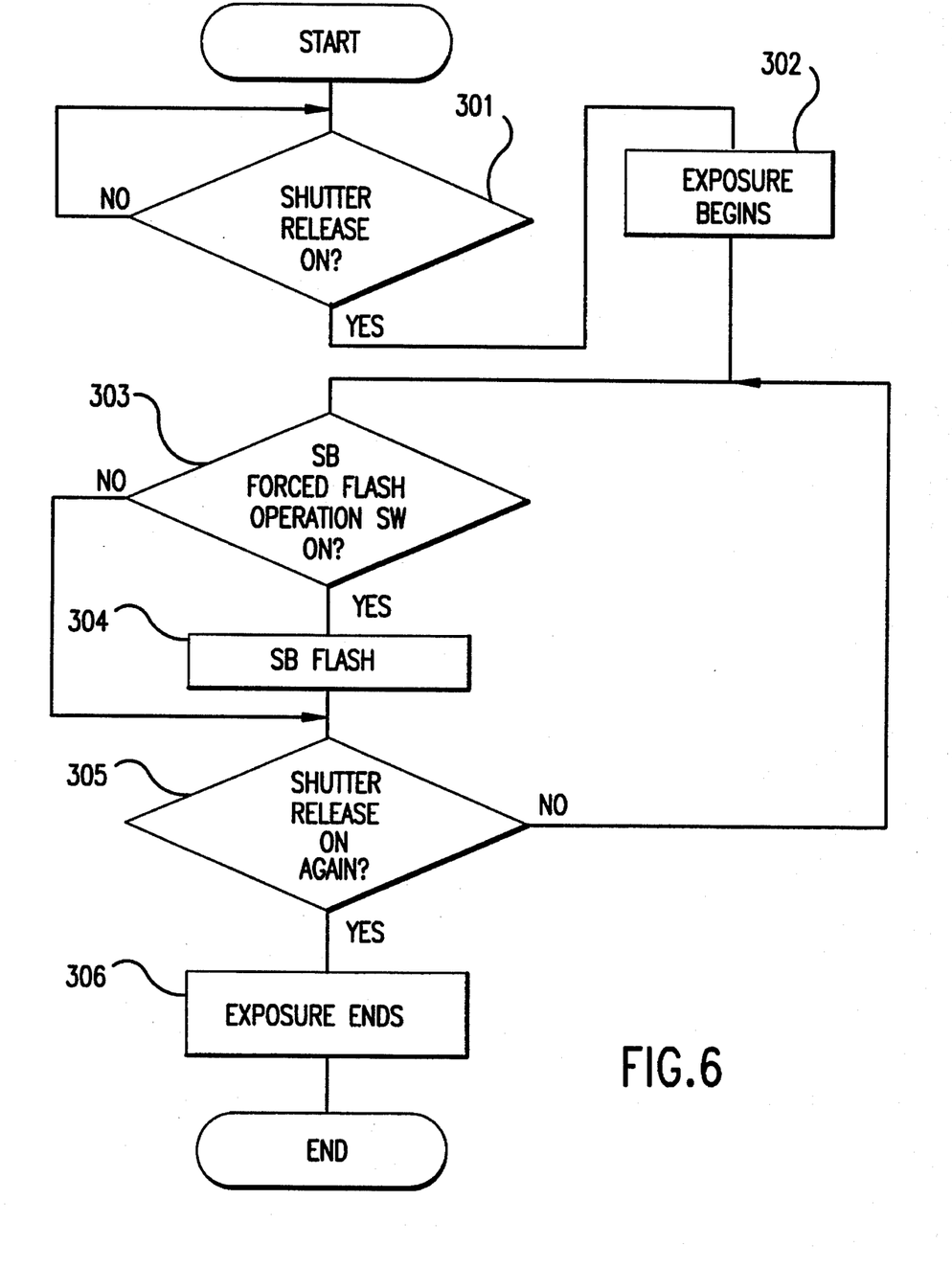
FIG. 6 is a flow chart showing operation of a camera according to an alternative embodiment of the invention.

When, for example, a long-term exposure mode has been set, in step 301 it is determined whether release switch 9 is depressed or otherwise operated. If release switch 9 is not depressed, a waiting state continues until release switch 9 is depressed. Once release switch 9 is depressed, light exposure of the film in the camera commences in step 302.

In step 303, it is determined whether strobe forced flash switch 12 is operated. Operation of strobe forced flash switch 12 can occur either before or after operation of release switch 9. If in step 303 it is determined that strobe forced flash switch 12 has been operated, strobe flash occurs in step 304. Otherwise, step 304 is skipped.

In step 305, it is determined whether release switch 9 has been operated again. If switch 9 has not been operated again, then steps 303–305 are repeated. If strobe forced flash switch 12 remains depressed during light exposure before switch 9 is operated again, for example, strobe 10 will flash repeatedly for a desired time period, until switch 12 is released. Further, if during exposure strobe forced flash switch 12 is turned off and then turned back on again, the strobe will flash again. Thus, even if the camera is in the flash prevention mode (due, e.g., to its operation in the long-term exposure mode), actuation of the strobe can be performed as desired by the photographer. The photographer can cause the strobe 10 to flash at any arbitrary time during a single light exposure operation in accordance with the desires of the photographer.

Once switch 9 is operated again, light exposure is terminated in step 306.

The invention is not limited to the embodiments described above. It also is possible to alter various components in camera 1 appropriately to obtain numerous variations. For instance, in camera 1 equipped with an SB forced flash operation button 12, it is possible to provide that even after strobe 10 is illuminated when the shutter release is operated according to the FIG. 2 embodiment, for example, strobe forced flash is executed in accordance with the desires of the photographer by again depressing forced flash operation button 12, according to the FIG. 5 embodiment, for example. Additionally, a camera other than a compact camera can be used. Embodiments of the invention can be applied to any camera equipped with a strobe for flash photography.

As explained above, superior results are achieved notwithstanding relatively straightforward construction. Flash-photography cameras according to the invention are equipped with switching means for switching completion of photograph exposure action to a specific mode in accordance with the operation of an operating component. Forced flash operation means is provided for forcing flash of the strobe, through manual operation, at the time of the release operation. The strobe automatic flash mode is released when a specific mode is selected by the switching means. Control means is provided for setting the strobe forced flash mode when the forced flash operation means is switched on, while preventing automatic flash of the strobe.

In other words, when a specific photography mode is set, automatic flash of the strobe is prevented while the photographer can execute forced flash of the strobe through a simple operation, that is, manual operation of strobe forced flash operation means. Photography is possible under a specific mode and strobe flash is performed according to the desires of the photographer and the condition of the subject. The number of blurred pictures thus can be reduced.

Additionally, with flash-photography cameras according to embodiments of the invention, when the strobe forced flash operation means is turned on, it is possible for the photographer to flash the strobe either one time or many times. Flash timing can be controlled arbitrarily, thereby obtaining desirable results when photographing moving subjects, for example.

While the invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention.

What is claimed is:

1. A method of operating a camera having an illumination device that is automatically activated during exposure of a photographic medium in the camera when lighting conditions are below a predetermined level, the method comprising:

setting an automatic illumination prevention mode of the camera to prevent automatic activation of the illumination device during exposure of the photographic medium in the camera;

determining whether an override illumination mechanism of the camera for overriding the automatic illumination prevention mode is activated;

setting an override illumination mode of the camera when the override illumination mechanism is activated; and activating the illumination device when the override illumination mode is set to illuminate a photographic subject during exposure of the photographic medium in the camera.

2. The method of claim 1, further comprising:

beginning exposure of the photographic medium by manually depressing a shutter release button; and ending exposure of the photographic medium by again depressing the shutter release button.

3. The method of claim 1, further comprising the step of beginning exposure of the photographic medium, wherein the determining step occurs before the beginning step.

4. The method of claim 1, further comprising:

beginning exposure of the photographic medium; and ending exposure of the photographic medium, wherein the determining step occurs between the beginning step and the ending step.

5. The method of claim 1, further comprising:

beginning exposure of the photographic medium;

deactivating the override illumination mechanism; and ending exposure of the photographic medium, wherein the activating step occurs repeatedly between the beginning step and the ending step until the deactivating step occurs.

6. The method of claim 1, further comprising:

beginning exposure of the photographic medium; and activating the override illumination mechanism at an arbitrary time after the beginning step.

7. The method of claim 6, wherein the step of activating the override illumination mechanism is performed manually.

8. The method of claim 1, further comprising beginning exposure of the photographic medium, wherein the activating step occurs in response to the beginning step.

9. The method of claim 2, wherein the activating step occurs between the beginning step and the ending step.

10. A camera, comprising:

a controller for controlling operation of the camera;

an illumination device coupled with the controller to illuminate a photographic subject to be photographed by the camera;

a mode-setting mechanism coupled with the controller to set an automatic illumination mode in which said illumination device is automatically activated during exposure of a photographic medium in the camera when lighting conditions are below a predetermined level, and an automatic illumination prevention mode in which said illumination device is not automatically activated during exposure of the photographic medium in the camera even when the lighting conditions are below the predetermined level;

an override illumination mechanism coupled with the controller to override the automatic illumination prevention mode and set an override illumination mode in which activation of said illumination device is enabled; and an exposure mechanism coupled with the controller to expose the photographic medium, the controller controlling the illumination device to illuminate the subject during exposure of the photographic medium in response to setting of the override illumination mode.

11. The camera of claim 10, wherein the controller comprises a determiner coupled with the override illumination mechanism to determine whether the override illumination mechanism has been activated during exposure of the photographic medium.

12. The camera of claim 10, wherein the controller controls the illumination device to illuminate the subject repeatedly during exposure of the photographic medium in response to setting of the override illumination mode.

13. The camera of claim 10, wherein the controller comprises a determiner coupled with the override illumination mechanism to determine whether the override illumination mechanism has been activated before exposure of the photographic medium.

14. The camera of claim 10, wherein the exposure mechanism comprises:

a shutter for exposing the photographic medium; and a shutter actuation button operable by an operator to begin exposure of the photographic medium and to end exposure of the photographic medium.

15. The camera of claim 10, wherein the mode-setting mechanism comprises an automatic illumination prevention button.

16. The camera of claim 15, wherein the mode-setting mechanism further comprises a mode-setting dial.

17. The camera of claim 10, wherein the override illumination mechanism comprises an override illumination button.

18. The camera of claim 15, wherein the override illumination mechanism comprises an override illumination button, said override illumination button being separate from said automatic illumination prevention button.

19. A camera, comprising:

control means for controlling operation of the camera;

an illumination device coupled with the control means to illuminate a photographic subject to be photographed by the camera;

mode-setting means coupled with the controller for setting an automatic illumination mode in which said illumination device is automatically activated during exposure of a photographic medium in the camera when lighting conditions are below a predetermined level, and an automatic illumination prevention mode in which said illumination device is not automatically activated during exposure of the photographic medium in the camera even when the lighting conditions are below the predetermined level;

override illumination means coupled with the control means for overriding the automatic illumination prevention mode and setting an override illumination mode in which activation of said illumination device is enabled; and an exposure mechanism coupled with the control means to expose the photographic medium, the control means controlling the illumination device to illuminate the subject during exposure of the photographic medium in response to setting of the override illumination mode by said override illumination means.

20. The camera of claim 19, wherein the control means comprises determining means coupled with the override illumination means for determining whether the override illumination means has been activated during exposure of the photographic medium.

21. The camera of claim 19, wherein the control means comprises determining means coupled with the override illumination means to determine whether the override illumination means has been activated before exposure of the photographic medium.

22. A camera, comprising:

a light exposure device that exposes film in the camera to a light image of a photographic subject;

an exposure commencement switch coupled with the light exposure device to commence operation of the light exposure device;

an exposure termination switch coupled with the light exposure device to terminate operation of the light exposure device;

an illumination device that illuminates a photographic subject; and an illumination device switch coupled with the illumination device to operate the illumination device to output light for a desired time period between commencement of operation of the light exposure device and termination of operation of the light exposure device.

23. The camera according to claim 22, further comprising a release switch coupled with the exposure commencement switch and with the exposure termination switch, the release switch being operated by a user to commence light exposure by actuating the exposure commencement switch and to terminate light exposure by actuating the exposure termination switch.

24. The camera according to claim 22, wherein the illumination device switch is repeatedly operatable to repeatedly operate the illumination device during a single light exposure operation.

* * * * *